US009789975B2

(12) United States Patent
Jha et al.

(10) Patent No.: US 9,789,975 B2
(45) Date of Patent: Oct. 17, 2017

(54) EXTERIOR AIRCRAFT LIGHT UNIT AND AIRCRAFT COMPRISING THE SAME

(71) Applicant: Goodrich Lighting Systems GMBH, Lippstadt (DE)

(72) Inventors: Anil Kumar Jha, Lippstadt (DE); Andre Hessling Von Heimendahl, Koblenz (DE); Franz-Josef Beermann, Warstein-Belecke (DE); Christian Schoen, Mainz (DE); Sascha Lueder, Rietberg (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 17 days.

(21) Appl. No.: 14/825,898

(22) Filed: Aug. 13, 2015

(65) Prior Publication Data

US 2016/0046388 A1 Feb. 18, 2016

(30) Foreign Application Priority Data

Aug. 14, 2014 (EP) .................................... 14180964

(51) Int. Cl.
*B64D 47/02* (2006.01)
*B64D 47/06* (2006.01)
(Continued)

(52) U.S. Cl.
CPC ............. *B64D 47/06* (2013.01); *B64D 47/02* (2013.01); *B64D 47/04* (2013.01); *F21V 7/0033* (2013.01);
(Continued)

(58) Field of Classification Search
CPC ........ B64D 47/06; B64D 47/04; B64D 47/02; B64D 2203/00; F21V 7/0025;
(Continued)

(56) References Cited

U.S. PATENT DOCUMENTS 2,356,654 A 8/1944 Cullman
5,813,743 A 9/1998 Naka
(Continued)

OTHER PUBLICATIONS

Code of Federal Regulations (US)—Title 14—Aeronautics and Space; Chapter I—Federal Aviation Administration, Department of Transportation; Subchapter C—Aircraft; Part 25—Airworthiness Standards: Transport Category Airplanes; Subpart F—Equipment; Subjgrp—Lights; Section 25.1401—Anticol. 2 pages.
(Continued)

*Primary Examiner* — Y M. Lee
(74) *Attorney, Agent, or Firm* — Cantor Colburn LLP

(57) ABSTRACT

An exterior aircraft light unit includes a mounting structure, an LED arranged on the mounting structure, and an optical system, arranged on the mounting structure for creating an output light emission distribution of the exterior aircraft light unit. The optical system has, in a first cross-sectional plane extending through the LED, a first concave reflector and a second concave reflector, each of the first and second concave reflectors having a proximate end positioned adjacent to the mounting structure and a distal end positioned removed from the mounting structure, with the first and second concave reflectors being arranged on opposite sides of the LED in the first cross-sectional plane, and a refractive optical element arranged between the first and second concave reflectors in the first cross-sectional plane. The distal ends of both the first and second concave reflectors that curve towards each other and have back-tapered shapes.

14 Claims, 3 Drawing Sheets

(51) Int. Cl.

| | |
|---|---|
| ***B64D 47/04*** | (2006.01) |
| ***F21V 7/08*** | (2006.01) |
| ***F21V 13/04*** | (2006.01) |
| *B64D 7/02* | (2006.01) |
| *F21V 7/00* | (2006.01) |
| *F21V 7/09* | (2006.01) |

(52) U.S. Cl.
CPC .............. *F21V 7/0066* (2013.01); *F21V 7/08* (2013.01); *F21V 13/04* (2013.01); *B64D 7/02* (2013.01); *B64D 2203/00* (2013.01); *F21V 7/0025* (2013.01); *F21V 7/09* (2013.01)

(58) Field of Classification Search
CPC ........ F21V 7/0033; F21V 7/0066; F21V 7/08; F21V 7/09; F21V 13/04
See application file for complete search history.

(56) References Cited

U.S. PATENT DOCUMENTS

| | | | | |
|---|---|---|---|---|
| 7,712,931 | B1 | 5/2010 | Smith | |
| 2006/0209541 | A1 | 9/2006 | Peck | |
| 2009/0262517 | A1 | 10/2009 | Suehiro et al. | |
| 2011/0026247 | A1 | 2/2011 | Zhang et al. | |
| 2011/0261577 | A1* | 10/2011 | Kohlmeier-Beckmann | B64D 47/06 362/545 |
| 2013/0107553 | A1* | 5/2013 | Desai | B64D 47/06 362/470 |
| 2014/0268732 | A1* | 9/2014 | Randolph | F21V 5/04 362/231 |

OTHER PUBLICATIONS

Jan. 1, 2012, pp. 25-27, XP055165013, retrieved from internet: URL:http://www.gpo.gov/fdsys/pkg/CFR-2012-title14-vol1/pdf/CFR-2012title4-vol1-sec25-1401.pdf [retrieved on Jan. 27, 2015].
Notification of Transmittal of the European Search Report; EP Application No. 14180964.0-1754; Feb. 16, 2015, 9 pages.
Schroder G Ed—Gottfried Schoder: "Technische Optik, 2.6 Anwendung Asphrischer Flaechen", Jan. 1, 1990, Technische Optik: Grundlagen Und Anwendungen, Vogel, Wurzburg, pp. 54-55, XP002222505, ISBN: 978-3-8023-0067-7, 2 pages.

* cited by examiner

EXTERIOR AIRCRAFT LIGHT UNIT AND AIRCRAFT COMPRISING THE SAME

TECHNICAL FIELD

The present invention relates to exterior aircraft lighting. In particular, the present invention relates to exterior aircraft light units for space-critical locations.

BACKGROUND

Almost all aircraft are equipped with exterior light units. Exterior light units are used for a variety of purposes. Some aircraft lights allow the pilots and crew to have a better active visibility of the aircraft itself and of the environment. Other aircraft lights are used for passive visibility of the aircraft or for signalling purposes. Examples of such lights are navigation lights, beacon lights and anti-collision lights.

In order to be visible from a wide range of angles, some of these lights, such as anti-collision lights or navigation lights, are mounted at locations where their light emission is particularly unobstructed, such as at wing tip locations or aircraft tail locations. These locations tend to be critical in terms of space available for exterior aircraft lighting.

Accordingly, it would be beneficial to provide an exterior aircraft light unit whose design allows for a particularly compact implementation.

SUMMARY

Exemplary embodiments of the invention include an exterior aircraft light unit that comprises a mounting structure, an LED arranged on the mounting structure, and an optical system, arranged on the mounting structure for creating an output light emission distribution of the exterior aircraft light unit. The optical system comprises, in a first cross-sectional plane extending through the LED, a first concave reflector and a second concave reflector, each of the first and second concave reflectors having a proximate end positioned adjacent to the mounting structure and a distal end positioned removed from the mounting structure, with the first and second concave reflectors being arranged on opposite sides of the LED in the first cross-sectional plane, and a refractive optical element arranged between the first and second concave reflectors in the first cross-sectional plane. The distal ends of both the first and second concave reflectors have back-tapered shapes, with the first and second concave reflectors curving towards each other at their distal ends.

The back-tapered shapes of the first and second concave reflectors allow for a strong re-directing of the light emitted by the LED. This strong re-directing of the light allows for the output light emission distribution to have a large opening angle in the first cross-sectional plane, while the optical system is very compact in the height dimension over the mounting structure. In other words, the back-tapered shapes of the first and second concave reflectors allow for a particularly good compromise between a large opening angle and a compact design of the optical system in the first cross-sectional plane. The compact design leads to further benefits, such as the reduction of the cut-out required for inserting the exterior aircraft light unit into the aircraft structures and a better arrangement of the optical system with respect to the lens cover, reducing undesired internal reflection. Further, the compact design leads to low weight.

The terminology of the first and second concave reflectors having back-tapered shapes, with the first and second concave reflectors curving towards each other at their distal ends, refers to a situation where the distance between the distal ends of the first and second concave reflectors is smaller than the distance between the first and second concave reflectors at at least one other point towards the mounting structure. In other words, the combination of the first and second concave reflectors is a structure that could not be cast in its final shape, because the portion of the mould, arranged between the first and second concave reflectors cannot be drawn out from between the reflectors. In yet other words, the distance between the proximate ends of the first and second concave reflectors is smaller than the distance between the distal ends of the first and second concave reflectors, which in turn is smaller than the distance between an intermediate portion of the first and second concave reflectors. Said distance between the intermediate portions is measured along a line parallel to the lines extending between the proximate ends and the distal ends of the first and second concave reflectors. The term back-tapered does not necessarily refer to a situation where the width-wise extension of the first and second concave reflectors becomes smaller towards the distal ends. While this is possible, the term back-tapered only refers to the positioning of the distal end of the reflective surface with respect to the other portions of the reflective surface.

The mounting structure forms a base for at least some of the other components of the exterior aircraft light unit. In particular, the mounting structure provides support for the LED, for the first and second concave reflectors as well as for the refractive optical element. The first and second concave reflectors and the refractive optical element may be mounted directly onto the mounting structure or via other support structures and/or via each other.

The refractive optical element may be a lens. In particular, the refractive optical element may have a concave proximate surface, as seen from the LED, and a convex distal surface, as seen from outside of the exterior aircraft light unit, in the first cross-sectional plane.

The expression of the optical system creating an output light emission distribution of the exterior aircraft light unit refers to the optical system transforming a source light emission distribution of the LED into a desired/required output light emission distribution. The exterior aircraft light unit may have a lens cover or may be arranged behind a lens cover, when mounted to the aircraft. Accordingly, the optical system and the lens cover may together achieve a desired transformation of the light intensity distribution. It is also possible that the lens cover has a weak influence on the light emission distribution and that the optical system achieves the whole desired transformation. Accordingly, while the term output light intensity distribution generally refers to the light intensity distribution leaving the optical system, it may also refer to the light intensity distribution outside of the lens cover.

According to a further embodiment, both the first concave reflector and the second concave reflector are elliptical in the first cross-sectional plane. In this way, both the first and the second concave reflectors may project the LED to a different location, such that a portion of the light emitted by the LED may be directed around the refractive optical element. At the same time, the emission distribution characteristics of the LED may be kept via this simple projection. The first concave reflector and the second concave reflector being elliptical means that their reflective surfaces are portions of an ellipse in the first cross-sectional plane.

According to a further embodiment, the LED is positioned in a first focal point of each of the first and second concave reflectors. In other words, the first and second concave reflectors and the LED are positioned in such a way with respect to each other that a first focal point of the elliptical first concave reflector coincides with the location of the LED and with a first focal point of the elliptical second concave reflector. In this way, a very controlled and focused reflection of the light emitted by the LED takes place.

According to a further embodiment, a second focal point of the first concave reflector and a second focal point of the second concave reflector are spaced apart. In other words, the second focal points of the elliptical first and second concave reflectors do not coincide. In yet other words, while the first and second concave reflectors are elliptical, they do not form part of the same ellipse. In this way, a spread between the projections of the LED via the first and second concave reflectors is achieved, contributing to the wide opening angle in the first cross-sectional plane.

According to a further embodiment, the optical system is symmetrical with respect to a main light emission direction of the LED in the first cross-sectional plane. With the LED having its main light emission direction normal to the mounting structure, it can also be said that the optical system is symmetrical with respect to a normal direction with respect to the mounting structure in the first cross-sectional plane. In this way, a symmetric opening angle and a symmetric output light emission distribution is achieved in the first cross-sectional plane.

According to a further embodiment, the LED, the first concave reflector and the second concave reflector are arranged in such a way that the light emitted by the LED and reflected by the first concave reflector in the first cross-sectional plane crosses the light emitted by the LED and reflected by the second concave reflector in the first cross-sectional plane. This crossing of the light reflected by the first concave reflector and the light reflected by the second concave reflector also contributes to achieving the wide distribution of the light, while at the same time ensuring a compact design of the exterior aircraft light unit.

According to a further embodiment, the LED, the first concave reflector, the second concave reflector and the refractive optical element are arranged in such a way that the light emitted by the LED in operation in the first cross-sectional plane is refracted or reflected by exactly one of the first concave reflector, the second concave reflector and the refractive optical element. In other words, the two reflectors and the refractive optical element are arranged in such a way that the light from the LED is affected by exactly one of these optical elements. In yet other words, each light ray emitted by the LED is refracted/re-directed by exactly one of the three optical elements. In yet other words, the three optical elements transform/re-direct separate portions of the light emitted by the LED. In this way, the three optical elements do not have to be designed with the properties of the respectively other optical elements being taken into account, but can be optimized for one particular transformation/re-direction.

According to a further embodiment, the output light emission distribution has an opening angle of at least 150° in the first cross-sectional plane. Accordingly, in the case of a symmetrical optical system, the opening angle extends at least 75° to both sides of the main light emission direction of the LED, i.e. at least 75° to both sides of the direction normal to the mounting structure. In this way, the exterior aircraft light unit is adapted to satisfy the requirements for anti-collision lights according to Federal Aviation Regulations (FAR) 23.1401. This provision requires light emission in an angular range of at least 75° below and above the horizontal plane. In other words, with the exterior aircraft light unit being oriented in a way that the first cross-sectional plane is a vertical cross-sectional plane, the exterior aircraft light unit may be adapted to satisfy the opening angle requirements of the FAR for anti-collision lights.

According to a further embodiment, the output light emission distribution in the first cross-sectional plane may be adapted to satisfy the vertical light emission distribution, as required by FAR 23.1401 for anti-collision lights. In other words, the output light emission distribution in the first cross-sectional plane may be equal to or exceed the minimum requirements defined in FAR 23.1401 for the various angles of the vertical light emission distribution.

According to a further embodiment, the optical system comprises, in a second cross-sectional plane extending through the LED and being orthogonal to the first cross-sectional plane, a first planar reflector and a second planar reflector, each of the first and second planar reflectors having a proximate end positioned adjacent to the mounting structure and a distal end positioned removed from the mounting structure, with the first and second planar reflectors being arranged on opposite sides of the LED in the second cross-sectional plane, wherein the refractive optical element is arranged between the first and second planar reflectors. With this structure of the optical system in the second cross-sectional plane, it is possible to achieve an output light emission distribution that satisfies the requirements of FAR 23.1401 for at least a portion of the horizontal light intensity distribution of an anti-collision light. Further, planar reflectors are particularly easy to produce and at the same time suffice—in combination with the refractive optical element—to achieve a desired output light emission distribution.

According to a further embodiment, the first concave reflector, the second concave reflector, the first planar reflector and the second planar reflector form an integrated reflector structure surrounding the LED and the refractive optical element. In other words, the mounting structure, the first and second concave reflectors, and the first and second planar reflectors form a trough-like structure, into which the LED and the refractive optical elements may be placed. The first and second concave reflectors and the first and second planar reflectors may be a one-piece structure or may be an assembly arranged from originally separate pieces.

According to a further embodiment, the first and second concave reflectors have the same shape in multiple cross-sectional planes parallel to the first cross-sectional plane. In other words, the concave shape of the first and second concave reflectors extends over an extended portion of the first and second reflectors. It is also possible that the first and second planar reflectors have the same shape in multiple cross-sectional planes parallel to the second cross-sectional plane. In other words, the first and second planar reflectors are reflective planes, which reduce to straight shapes in the second cross-sectional plane and cross-sectional planes parallel thereto. In this context, it is pointed out that the term planar, as used in this document, refers to a planar three-dimensional structure, which has a straight shape in a cross-sectional plane. This straight shape in the cross-sectional plane may also be referred to as planar due to the overall three-dimensional structure.

The refractive optical element, which may be a lens, may have a variety of shapes in the second cross-sectional plane. It is for example possible that the inner surface is comprised of straight portions, while the outer surface may be comprised of a combination of straight portions and a convex portion, when seen from outside of the exterior aircraft light unit.

According to a further embodiment, the refractive optical element and the first and second planar reflectors are arranged in such a way with respect to each other that the light emitted by the LED in operation in the second cross-sectional plane is passed through the refractive optical element, with a portion of the light being reflected by one of the first and second planar reflectors after being passed through the refractive optical element. In other words, the light emission distribution of the LED is transformed by the refractive optical element, before a portion of the light is reflected by the first and second planar reflectors, leading to a strong focussing of the output light emission distribution in the second cross-sectional plane. It is possible that the refractive optical element is shaped to have no or only a small effect on the light that is later reflected by the first and second planar reflectors. With this strong focus, the overall light yield of the LED may be used for a very efficient satisfying of the FAR requirements in a portion of the horizontal cross-sectional plane.

According to a further embodiment, the refractive optical element is supported on the proximate end portions of the first and second planar reflectors in the second cross-sectional plane.

According to a further embodiment, the output light emission distribution has an opening angle of between 40° and 80°, in particular of between 50° and 70°, in the second cross-sectional plane. In this way, the light of the LED is used in a very focussed manner. This in turn leads to a situation where the light emission of one LED may be sufficient for satisfying the requirements of FAR 23.1401 for the entire vertical cross-section over a horizontal opening angle of between 40° and 80°, in particular of between 50° and 70°. In this way, an exterior aircraft light unit may be provided that forms a unit module that can be used in various locations around the aircraft. In this way, the whole desired exterior aircraft illumination for a particular purpose, such as the anti-collision lighting, may be achieved via such high-efficiency unit modules. Further, the exterior aircraft light unit may have an overall very compact design, leading to a particularly reduced cut-out in the aircraft structures.

According to a further embodiment, the exterior aircraft light unit is an anti-collision light unit, with the first cross-sectional plane being a vertical cross-sectional plane thereof and with the second cross-sectional plane being a horizontal cross-sectional plane thereof. In other words, the output light emission distribution in the first cross-sectional plane may be a desired vertical light emission distribution of the anti-collision light unit, while the output light emission distribution in the second cross-sectional plane may be a desired horizontal light emission distribution. In this particular embodiment, the LED is provided for anti-collision light functionality.

According to a further embodiment, the LED is the only light source used for anti-collision light functionality of the exterior aircraft light unit. In other words, one LED is sufficient for satisfying a desired or required output light intensity distribution of the exterior aircraft light unit, which has various benefits. With only one light source being present, the optical system may be readily adapted to the one location from where all light is emitted. Further, with only one light source being present, heat transfer and thermal management may be optimized in a straightforward manner. Using one light source with very high efficiency also leads to overall lower power consumption, lower heat generation, better thermal management and higher reliability/less maintenance efforts.

According to a further embodiment, the exterior aircraft light unit further comprises at least two additional function light sources, with each of the at least two additional function light sources being arranged adjacent a back side of a respective one of the first and second concave reflectors and emitting at least part of their light towards the back side of the respective one of the first and second concave reflectors, with each of the back sides of the first and second concave reflectors being at least partially reflective. In this way, the space of the exterior aircraft light unit may be additionally used for providing light sources that serve a different function as compared to above discussed LED. In this way, the already compact exterior aircraft light unit may be configured to be a dual purpose exterior aircraft light unit, thus reducing the overall number of exterior aircraft light units arranged on an aircraft. The expression of the two additional function light sources being arranged adjacent a back side of one of the first and second concave reflectors is to be understood in such a way that the first concave reflector is positioned between the LED and one of the additional function light sources and that the second concave reflector is positioned between the LED and another one of the additional function light sources.

According to a further embodiment, each of the additional function light sources is an LED, also referred to as additional function LED.

According to a further embodiment, each of the back sides of the first and second concave reflectors is shaped for re-directing the light of the respective additional function light source at an angle of up to 90°. In other words, the reflective back sides of the first and second concave reflectors may have a free form shape that allows for a desired transformation of the light emission distribution, as emitted by the additional function light sources, wherein the re-directing comprises angles of re-direction of up to 90° with respect to the light emission direction before reflection. In yet other words, at least one of the light rays of each of the additional function light sources is re-directed by 90° by the respective back side of the first and second concave reflectors.

According to a further embodiment, the exterior aircraft light unit further comprises at least two collimating reflectors, with each one of the two collimating reflectors being associated with one of the at least two additional function light sources, wherein each one of the additional function light sources is arranged between the respectively associated one of the first and second concave reflectors and the respectively associated collimating reflector. By providing collimating reflectors, a strong peak of the output light emission distribution for the second purpose of the exterior aircraft light unit is achieved. The combination of the collimating reflector with the reflective back side of the respective concave reflector allows for a combination of a strong peak and a wide opening angle. All of this is achieved in a very compact manner due to the arrangement described.

According to a further embodiment, the exterior aircraft light unit is a combined anti-collision and navigation light unit, with the at least two additional function light sources being in operation used for navigation light functionality of the exterior aircraft light unit. As discussed above, the LED arranged between the first and second concave reflectors, may in operation be used for anti-collision light functionality. Accordingly, a combined anti-collision and navigation light module may be provided with a low number of light sources. Being a unit module, the whole navigation light and anti-collision light functions of the aircraft may be implemented with this one kind of unit module.

Exemplary embodiments of the invention further include an aircraft, such as an airplane, in particular a passenger or cargo airplane, comprising at least one exterior aircraft light unit, as described in any of the embodiments above. The modifications and advantages discussed above with respect to the exterior aircraft light unit analogously apply to the aircraft.

According to a particular embodiment, the aircraft comprises a plurality of exterior aircraft light unit, as described in any of the embodiments above, wherein the plurality of exterior aircraft light units jointly satisfy the anti-collision lighting functionality of the aircraft. It is further possible that this same plurality of exterior aircraft light units additionally satisfies the navigation lighting functionality of the aircraft.

The term anti-collision light refers to a light that in operation flashes in order to call a high degree of attention to the airplane. Anti-collision lights are mainly used during the flight and are commonly installed in the wings, in particular the wing tips, and the tail of an airplane. The term navigation light refers to the kind of exterior aircraft light unit that constantly emits light for passive visibility. In many applications, a navigation light emits one of red, green and white light, such that other aircraft can deduce the orientation and moving direction of the aircraft in question.

BRIEF DESCRIPTION OF DRAWINGS

Further exemplary embodiments of the invention are described with respect to the accompanying drawings, wherein.

DETAILED DESCRIPTION

Figure 1:
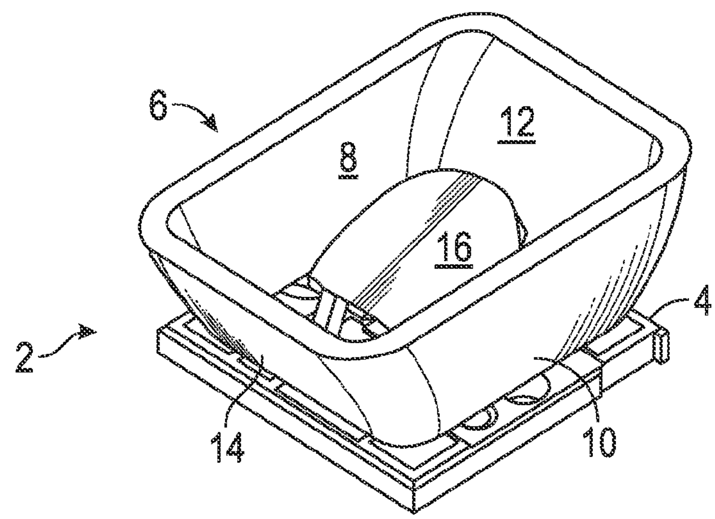
FIG. 1 shows a perspective three-dimensional view of selected components of an exterior aircraft light unit in accordance with an exemplary embodiment of the invention.

FIG. 1 shows selected components of an exterior aircraft light unit 2 in accordance with an exemplary embodiment of the invention. The exterior aircraft light unit 2 comprises a mounting structure 4 and an optical system 6. The optical system 6 is attached to the mounting structure 4. The optical system 6 comprises a first concave reflector 8, a second concave reflector 10, a first planar reflector 12, and a second planar reflector 14. As can be seen in FIG. 1, the first and second concave reflector 8 and 10 and the first and second planar reflectors 12 and 14 are attached to each other and form a trough-like structure. This trough-like structure may be assembled from the four reflectors, but may also be an integrated one-piece component. The adjectives concave and planar refer to the inner surface of the respective reflector structure, i.e. to the surface forming the respective inner portion of the trough-like structure. The adjectives concave and planar are not intended to be in any way descriptive of the respective outer surfaces of the reflectors.

The optical system 6 further comprises a refractive optical element 16. The refractive optical element 16 is a lens that is arranged inside the trough-like structure of the first and second concave reflectors 8 and 10 and the first and second planar reflectors 12 and 14.

Figure 2:
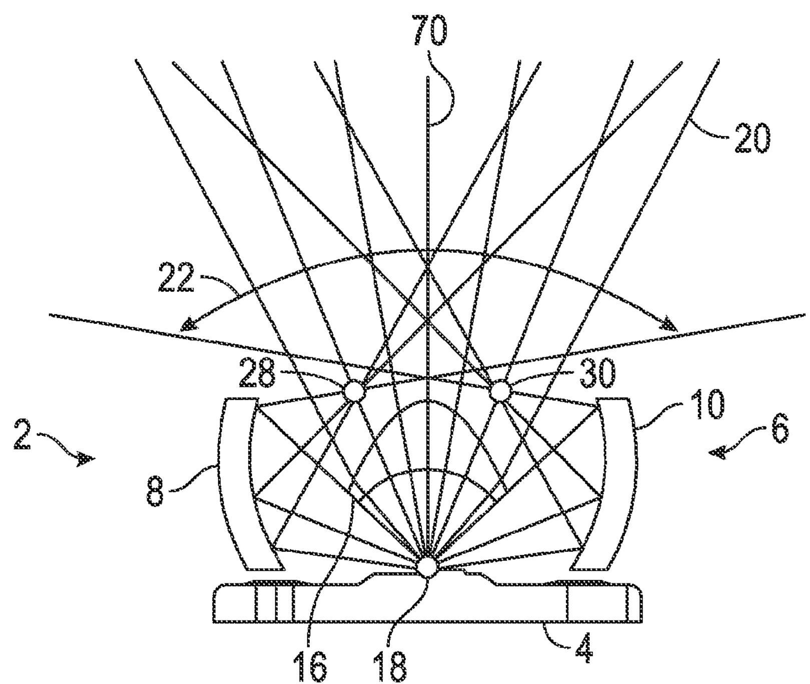
FIG. 2 shows a cross-sectional view of the exterior aircraft light unit of FIG. 1 along a first cross-sectional plane.

In FIG. 2, the exterior aircraft light unit 2 is shown in a first cross-sectional view. The first cross-sectional plane, depicted in FIG. 2, extends through the exterior aircraft light unit 2 in a direction that is a vertical cross-section during the use of the exterior aircraft light unit 2.

As stated with respect to FIG. 1, the exterior aircraft light unit 2 comprises a mounting structure 4. It further comprises an LED 18 that is disposed in the center of the mounting structure 4 in the first cross-sectional plane. The refractive optical element 16 is arranged over the LED 18. The terminology of the refractive optical element 16 being arranged over the LED 18 implies that the refractive optical element 16 covers—inter alia—the main light emission direction 70 of the LED 18, i.e. the direction 70 normal to the mounting structure 4.

The first concave reflector 8 is positioned towards the left of the refractive optical element 16, and the second concave reflector 10 is positioned towards the right of the refractive optical element 16 in the cross-sectional view of FIG. 1. Both of the first and second concave reflectors 8 and 10 have a proximate end, which is positioned adjacent to the mounting structure 4. Further, both of the first and second concave reflectors extend from their proximal ends to their distal ends, which are removed from the mounting structure 4. The distal ends of the first and second concave reflectors 8 and 10 are curved towards each other. In other words, the tangents to the inner surfaces of the distal ends of the first and second concave reflectors 8 and 10 cross above the mounting structure 4 in the cross-sectional view of FIG. 2. This curving of the first and second concave reflectors towards each other results in a distance of the distal ends that is smaller than a distance between the first and second concave reflectors at at least one other point between the proximate ends and the distal ends. This shape of the first and second concave reflectors is also referred to as a back-tapered shape of the first and second concave reflectors at the distal ends.

The distal ends of the first and second concave reflectors 8, 10 are substantially as far removed from the mounting structure 4 as the outermost point of the refractive optical element 16. The refractive optical element 16 is comprised of a concave inner surface, which is circular in the exemplary embodiment of FIG. 2, and a convex outer surface. The concave inner surface and the convex outer surface do not merge, but are separated by a short straight line at the left and right ends of the refractive optical element 16.

The functioning of the optical system 6 of the exterior aircraft light unit 2 in the first cross-sectional plane is now described with respect to the shown exemplary light rays 20. In particular, there are shown three exemplary light rays 20 that leave the LED 18, are reflected by the first concave reflector 8 and leave the exterior aircraft light unit 2 at angles of 25° to 75° with respect to the normal direction 70 towards the top right in the drawing plane of FIG. 2. Further, there are shown three exemplary light rays 20 that are emitted from the LED 18, are reflected by the second concave reflector 10 and leave the exterior aircraft light unit 2 at angles of −75° to −25° towards the top left in the drawing plane of FIG. 2. Further, six exemplary light rays 20 are shown that leave the LED 18, are refracted by the refractive optical element 16 and leave the exterior aircraft light unit 2 towards the top at angles of −25° to 25° with respect to the normal direction 70.

With each of the first concave reflector 8 and the second concave reflector 10 having an elliptical shape, each of the first concave reflector 8 and the second concave reflector 10 has two focal points. For each of the first concave reflector 8 and the second concave reflector 10, the respective first focal point coincides with the location of the LED 18. The first concave reflector 8 has a second focal point 28, while the second concave reflector 10 has a second focal point 30. The first concave reflector 8 reflects all light collected from the LED 18 through the second focal point 28. Analogously, the second concave reflector 10 reflects all light collected from the LED 18 through the second focal point 30. In this way, a projection of a portion of the light emitted from the LED 18 is effected to two locations removed from the mounting structure 4. The refractive optical element 16 effects a slight refraction towards the main light emission direction 70 for the light collected from the LED 18.

In this way, an output light emission distribution with an opening angle of 150°, as indicated with reference numeral 22, is achieved, which satisfies the requirements of FAR 23.1401 for the vertical light emission distribution of anti-collision lights.

Figure 3:
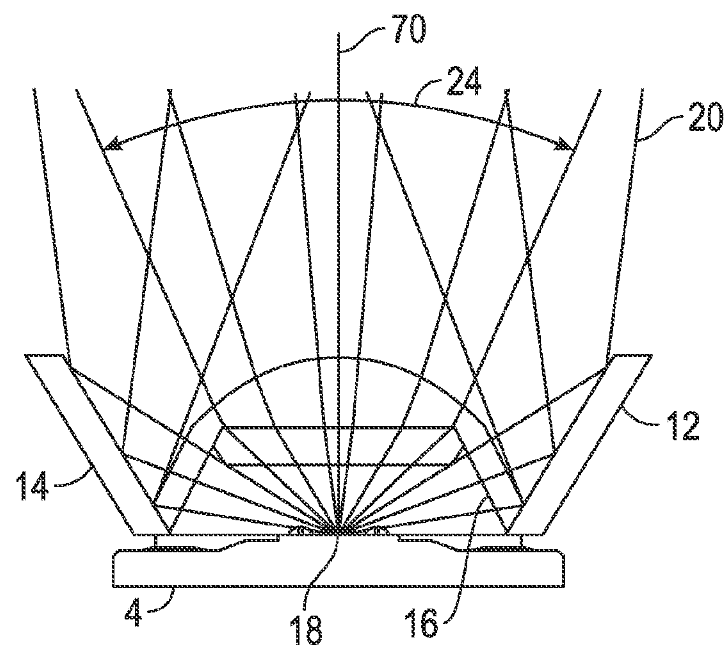
FIG. 3 shows a cross-sectional view of the exterior aircraft light unit of FIG. 1 along a second cross-sectional plane.

FIG. 3 shows the exterior aircraft light unit 2 of FIG. 1 in a second cross-sectional view. The second cross-sectional plane, depicted in FIG. 3, extends through the LED 18 and is orthogonal to the first cross-sectional plane, depicted in FIG. 2. In the second cross-sectional plane, the optical system 6 comprises a first planar reflector 12 and a second planar reflector 14. The first and second planar reflectors 12 and 14 extend from their proximate ends, which are adjacent the mounting structure 4, to their distal ends, which are removed from the mounting structure 4. With respect to the mounting structure 4, the first and second planar reflectors 12 and 14 are angled towards the outside at an angle of about 30° with respect to a direction 70 normal to the mounting structure 4. The LED 18 is disposed in the center of the mounting structure 4 in the second cross-sectional plane and is thus arranged between the first planar reflector 12 and the second planar reflector 14.

The refractive optical element 16 covers the LED 18 in the second cross-sectional plane in such a way that all light emitted from the LED 18 in the second cross-sectional plane is passed through the refractive optical element 16, before it is output from the exterior aircraft light unit 2, potentially after being reflected by one of the first and second planar reflectors 12 and 14. The inner surface of the refractive optical element 16 is comprised of three planar sections in the second cross-sectional plane. The outer surface of the refractive optical elements is comprised of a convex middle section, surrounded by two planar sections, in the second cross-sectional plane.

The functioning of the optical system 6 in the second cross-sectional plane is described with respect to the exemplary light rays 20, depicted in FIG. 3. In particular, there are shown three exemplary light rays 20 that leave the LED 18, pass the refractive optical element 16 virtually unaltered in direction, are reflected by the first planar reflector 12 and leave the exterior aircraft light unit 2 towards the top at angles of −20° to 10° with respect to the normal direction 70. Further, there are shown three exemplary light rays 20 that leave the LED 18, pass the refractive optical element 16 virtually unaltered in direction, are reflected by the second planar reflector 14 and leave the exterior aircraft light unit 2 towards the top at angles of −10° to 20° with respect to the normal direction 70. Further, six exemplary light rays 20 are shown that leave the LED 18, are refracted by the refractive optical element 16 and leave the exterior aircraft light unit 2 towards the top at angles of −30° to 30° with respect to the normal direction 70. Those six exemplary light rays are refracted towards the direction 70 normal to the mounting structure 4, i.e. towards the main light emission direction 70 of the LED 18.

The optical system 6 generates an output light emission distribution in the second cross-sectional plane that has an opening angle of 60°, which is indicated by reference numeral 24. The whole illumination power of the LED 18 in the second cross-second plane is used for the comparably small opening angle of 60° in the exemplary embodiment described.

In this way, an output light emission distribution with an opening angle of 60°, as indicated with reference numeral 24, is achieved, which satisfies the requirements of FAR 23.1401 for a portion of the horizontal light emission distribution of anti-collision lights.

Figure 4:
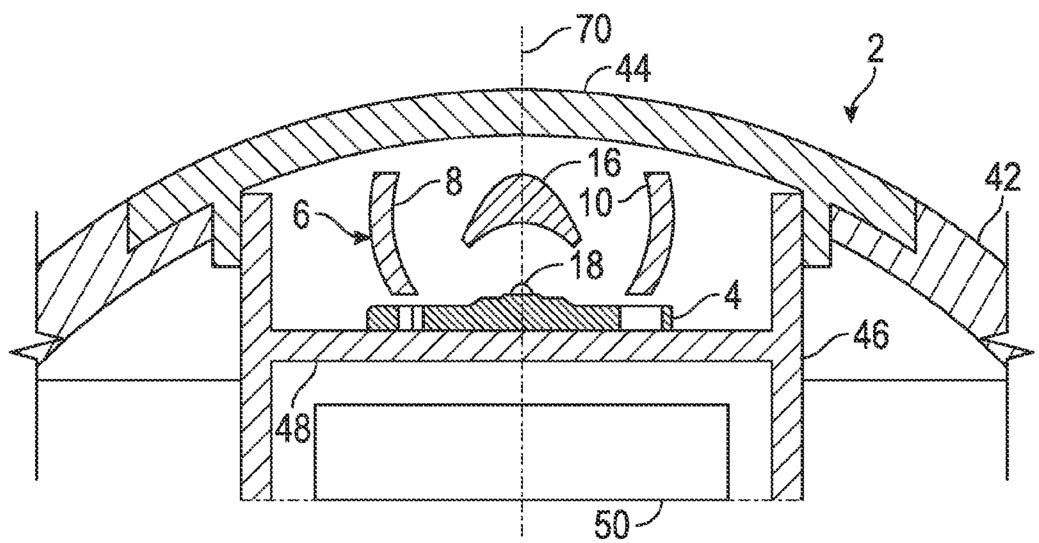
FIG. 4 shows a cross-sectional view of the exterior aircraft light unit of FIG. 1, mounted to an aircraft wing structure, in the first cross-sectional plane.

FIG. 4 shows the exemplary exterior aircraft light unit 2 of FIG. 1, when arranged in its operating position in an aircraft wing structure 42. FIG. 4 shows the same cross-sectional view as FIG. 2, i.e. FIG. 4 shows the exterior aircraft light unit 2 in the first cross-sectional view. The aircraft wing structure 42 has an opening for receiving the exterior aircraft light unit 2.

In addition to the components discussed above, the exterior aircraft light unit 2 comprises a support structure 46, which is fitted into the opening of the aircraft wing structure 42. The support structure is closed with a lens cover 44, whose shape is integrated into the shape of the aircraft wing structure 42. In other words, the aircraft wing structure 42 and the lens cover 44 jointly form the aerodynamic profile of the depicted section of the aircraft wing. The support structure 46 has a support plate 48 and forms a first space between the support plate 48 and the lens cover 44. Above described elements of the exterior aircraft light unit, namely the mounting structure 4, the optical system 6, and the LED 18, are disposed in this first space. A second space is provided on the opposite side of the support plate 48. Drive electronics 50 are disposed in this second space.

Figure 5:
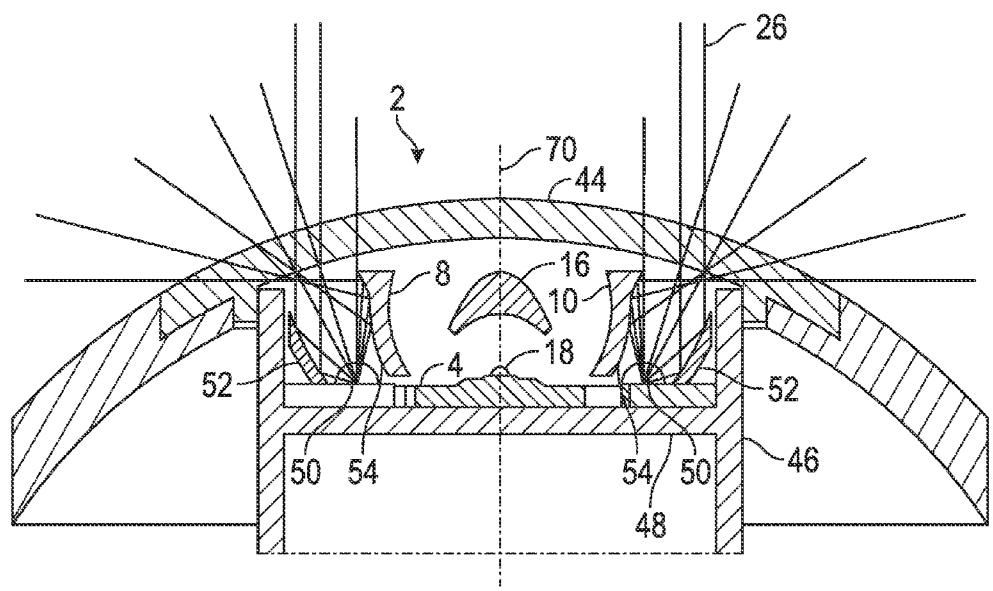
FIG. 5 shows a cross-sectional view of an exterior aircraft light unit in accordance with a second exemplary embodiment of the invention.

FIG. 5 shows a second exemplary exterior aircraft light unit 2 in accordance with the invention. Like elements are denoted with like reference numerals. The exterior aircraft light unit 2 of FIG. 5 is a modification of the exterior aircraft light unit 2 of FIG. 4. It is also shown as part of the aircraft wing structure 42 and is also shown in the first cross-sectional plane, as defined with respect to FIG. 2. The optical system 6 of the exterior aircraft light unit 2 of FIG. 5 allows for the shaping of the output light emission distribution of the light emitted from LED 18 in the same manner as the optical system 6, described with respect to FIGS. 2 to 4. The details of this output light emission distribution in the first cross-sectional plane, which contributes to the anti-collision lighting functionality of the exterior aircraft light unit 2, are not repeated for brevity.

In addition to the anti-collision lighting functionality, the exterior aircraft light unit 2 of FIG. 5 also has navigation lighting functionality. For this purpose, the exterior aircraft light unit 2 has a design that is somewhat different from the exterior aircraft light unit of FIGS. 2 to 4.

In particular, the mounting structure 4 of the exterior aircraft light unit 2 of FIG. 5 has a greater lateral extension than in FIG. 4. The mounting structure 4 extends beyond the first and second concave reflectors of the optical system 6 towards the left and right in the first cross-sectional plane. Two additional function light sources 50 are disposed on these extended portions of the mounting structure 4. Both of the additional function light sources 50 are disposed on the respective outsides of the first and second concave reflectors 8 and 10, i.e. they are further removed from the LED 18 than the first and second concave reflectors 8 and 10. The additional function light sources 50 are referred to as additional function light sources, because they provide for the navigation light functionality of the exterior aircraft light unit 2 in operation, whereas the LED 18 provides for the anti-collision light functionality in operation.

The exterior aircraft light unit 2 of FIG. 5 further comprises two collimating reflectors 52. Each one of the two collimating reflectors 52 is associated with one of the two additional function light sources 50. In particular, each collimating reflector 52 is positioned to the outside of the respective additional function light source 50, when seen from the LED 18.

Further, the back sides 54 of the first and second concave reflectors 8 and 10 are reflective and have a shape to effect a desired reflection of the light emitted from the two additional function light sources 50, as discussed below. When seen from the respective additional function light source 50, the back side 54 of the concave reflector in question is comprised of a convex lower portion and a concave upper portion.

The light emission characteristics of the exterior aircraft light source 2 in the navigation lighting mode, i.e. in the lighting mode where the additional function light sources 50 emit light, are now discussed with respect to exemplary light rays 26.

For each of the two additional function light sources 50, there are shown two exemplary light rays 26 that leave the respective additional function light source 50, are reflected by the respective collimating reflector 52 and leave the exterior aircraft light unit 2 straight towards the top. In other words, the collimating reflector collects a portion of the light emitted by the additional function light source 50 and collimates this portion in a direction normal to the mounting structure 4. Further, there are shown three exemplary light rays 26 that leave the respective additional function light source 50, are reflected by the back side 54 of the respective concave reflector 8 or 10 and leave the exterior aircraft light unit 2 towards the right/left at various angles. Further, there are shown three exemplary light rays 26 that leave the respective additional function light source 50 without being reflected by the back side 54 of the respective concave reflector 8 or 10 and without being reflected by the respective collimating reflector 52. In other words, these light rays pass between the back side 54 of the respective concave reflector 8 or 10 and the respective collimating reflector 52 towards the outside. All exemplary light rays leave the exterior aircraft light unit 2 via the lens cover 44.

The light emission characteristics of the exterior aircraft light unit 2 in the navigation lighting mode has a number of particular properties. First, a strong peak in the direction 70 normal to the mounting structure is achieved via the collimating reflectors 52. This direction is also the main light emission direction of the additional function light sources 50 in the exemplary embodiment of FIG. 5. Second, a very wide opening angle of 180° is achieved in the first cross-sectional plane. This is made possible by the back sides 54 of the first and second concave reflectors 8 and 10, which are shaped to allow for a re-directing of the light up to 90°. Third, transition regions between the peak direction 70 normal to the mounting structure 4 and the 90° directions with respect thereto are formed. In these transition regions, light emitted directly by the additional function light sources 50 combines with light reflected by the back sides 54 of the first and second concave reflectors 8, 10. The resulting light emission distribution in the navigation lighting mode is such that it satisfies the FAR regulations for the vertical light emission distribution of navigation lights.

Figure 6:
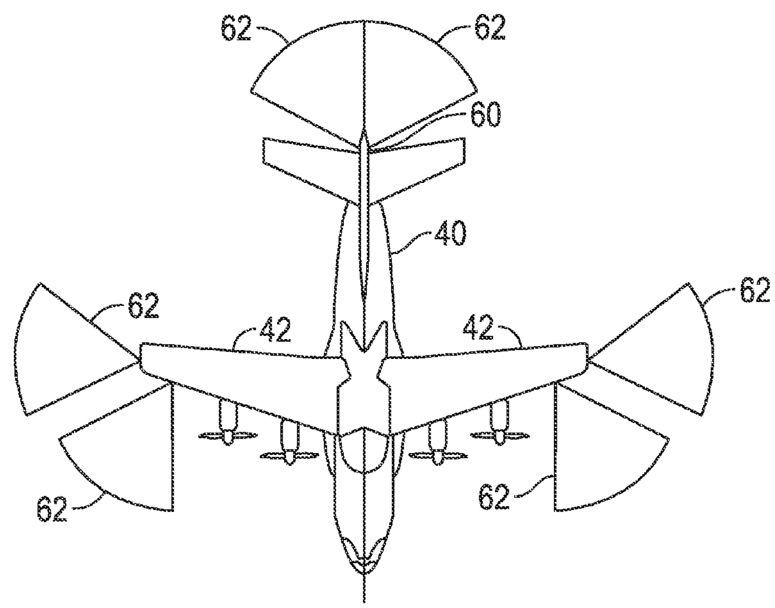
FIG. 6 shows a top view representation of an aircraft equipped with six exterior aircraft light units in accordance with exemplary embodiments of the invention.

In FIG. 6, an exemplary aircraft 40 is shown in a top view. The aircraft 40 is equipped with six exterior aircraft light units, which are all in accordance with any of the embodiments discussed above and which are illustrated via their light emission distributions in the horizontal cross-sectional plane. As discussed above with respect to FIG. 3, the exterior aircraft light units have an opening angle of 60° in the horizontal cross-sectional plane. Accordingly, the light emission distributions of the exterior aircraft light units of FIG. 6 are each illustrated by sectors 62 of a circle, each sector 62 having an opening angle of 60°.

Two exterior aircraft light units are mounted to the tail 60 of the aircraft 40. Further, two exterior aircraft light units are mounted to each of the left and right wings 42 of the aircraft 40. In particular, each wing 42 has one exterior aircraft light unit integrated into the wing tip and one exterior aircraft light unit integrated into the front edge of the wing, close to the wing tip.

The six exterior aircraft light units provide for a 360° illumination around the aircraft 40 in the anti-collision lighting mode. In the exemplary embodiment of FIG. 6, they equally provide for a 360° illumination around the aircraft 40 in the navigation lighting mode.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Exterior aircraft light unit, comprising:

a mounting structure, an LED arranged on the mounting structure, and an optical system, arranged on the mounting structure for creating an output light emission distribution of the exterior aircraft light unit, wherein the optical system comprises, in a first cross-sectional plane extending through the LED:

a first concave reflector and a second concave reflector, each of the first and second concave reflectors having a proximate end positioned adjacent to the mounting structure and a distal end positioned separated from the mounting structure, with the first and second concave reflectors being arranged on opposite sides of the LED in the first cross-sectional plane, and a refractive optical element arranged between the first and second concave reflectors in the first cross-sectional plane, wherein the distal ends of both the first and second concave reflectors have back-tapered shapes, with the first and second concave reflectors curving towards each other at their distal ends, wherein the LED, the first concave reflector and the second concave reflector are arranged in such a way that the light emitted by the LED and reflected by the first concave reflector in the first cross-sectional plane crosses the light emitted by the LED and reflected by the second concave reflector in the first cross-sectional plane.

2. Exterior aircraft light unit according to claim 1, wherein both the first concave reflector and the second concave reflector are elliptical in the first cross-sectional plane.

3. Exterior aircraft light unit according to claim 2, wherein the LED is positioned in a first focal point of each of the first and second concave reflectors.

4. Exterior aircraft light unit according to claim 2, wherein a second focal point of the first concave reflector and a second focal point of the second concave reflector are spaced apart.

5. Exterior aircraft light unit according to claim 1, wherein the LED, the first concave reflector, the second concave reflector and the refractive optical element are arranged in such a way that the light emitted by the LED in operation in the first cross-sectional plane is refracted or reflected by exactly one of the first concave reflector, the second concave reflector and the refractive optical element.

6. Exterior aircraft light unit according to claim 1, wherein the output light emission distribution has an opening angle of at least 150° in the first cross-sectional plane.

7. Exterior aircraft light unit according to claim 1, wherein the optical system comprises, in a second cross-sectional plane extending through the LED and being orthogonal to the first cross-sectional plane:

a first planar reflector and a second planar reflector, each of the first and second planar reflectors having a proximate end positioned adjacent to the mounting structure and a distal end positioned separated from the mounting structure, with the first and second planar reflectors being arranged on opposite sides of the LED in the second cross-sectional plane, wherein the refractive optical element is arranged between the first and second planar reflectors.

8. Exterior aircraft light unit according to claim 7, wherein the first concave reflector, the second concave reflector, the first planar reflector and the second planar reflector form an integrated reflector structure surrounding the LED and the refractive optical element.

9. Exterior aircraft light unit according to claim 7, wherein the output light emission distribution has an opening angle of between 40° and 80°, in particular of between 50° and 70°, in the second cross-sectional plane.

10. Exterior aircraft light unit according to claim 1, wherein the exterior aircraft light unit is an anti-collision light unit, with the first cross-sectional plane being a vertical cross-sectional plane thereof and with the second cross-sectional plane being a horizontal cross-sectional plane thereof.

11. Exterior aircraft light unit according to claim 1, further comprising at least two additional function light sources, with each of the at least two additional function light sources being arranged adjacent a back side of a respective one of the first and second concave reflectors and emitting at least part of their light towards the back side of the respective one of the first and second concave reflectors, with each of the back sides of the first and second concave reflectors being at least partially reflective and, in particular, being shaped for re-directing the light of the respective additional function light source up to 90°.

12. Exterior aircraft light unit according to claim 11, further comprising at least two collimating reflectors, with each one of the two collimating reflectors being associated with one of the at least two additional function light sources, wherein each one of the additional function light sources is arranged between the respectively associated one of the first and second concave reflectors and the respectively associated collimating reflector.

13. Exterior aircraft light unit according to any of claim 11, wherein the exterior aircraft light unit is a combined anti-collision and navigation light unit, with the at least two additional function light sources being in operation used for navigation light functionality of the exterior aircraft light unit.

14. An aircraft comprising at least one exterior aircraft light unit according to claim 1.

* * * * *